May 10, 1966  E. J. DE HOFF  3,250,184

ZERO PEDAL TRAVEL POWER BRAKE ASSEMBLY

Filed Nov. 26, 1963  2 Sheets-Sheet 1

INVENTOR.
Edward J. DeHoff
BY
D. D. McGrant
HIS ATTORNEY

May 10, 1966  E. J. DE HOFF  3,250,184
ZERO PEDAL TRAVEL POWER BRAKE ASSEMBLY
Filed Nov. 26, 1963  2 Sheets-Sheet 2

INVENTOR.
Edward J. DeHoff
BY
D.D. McGraw
HIS ATTORNEY ly shown.

Figure 1:
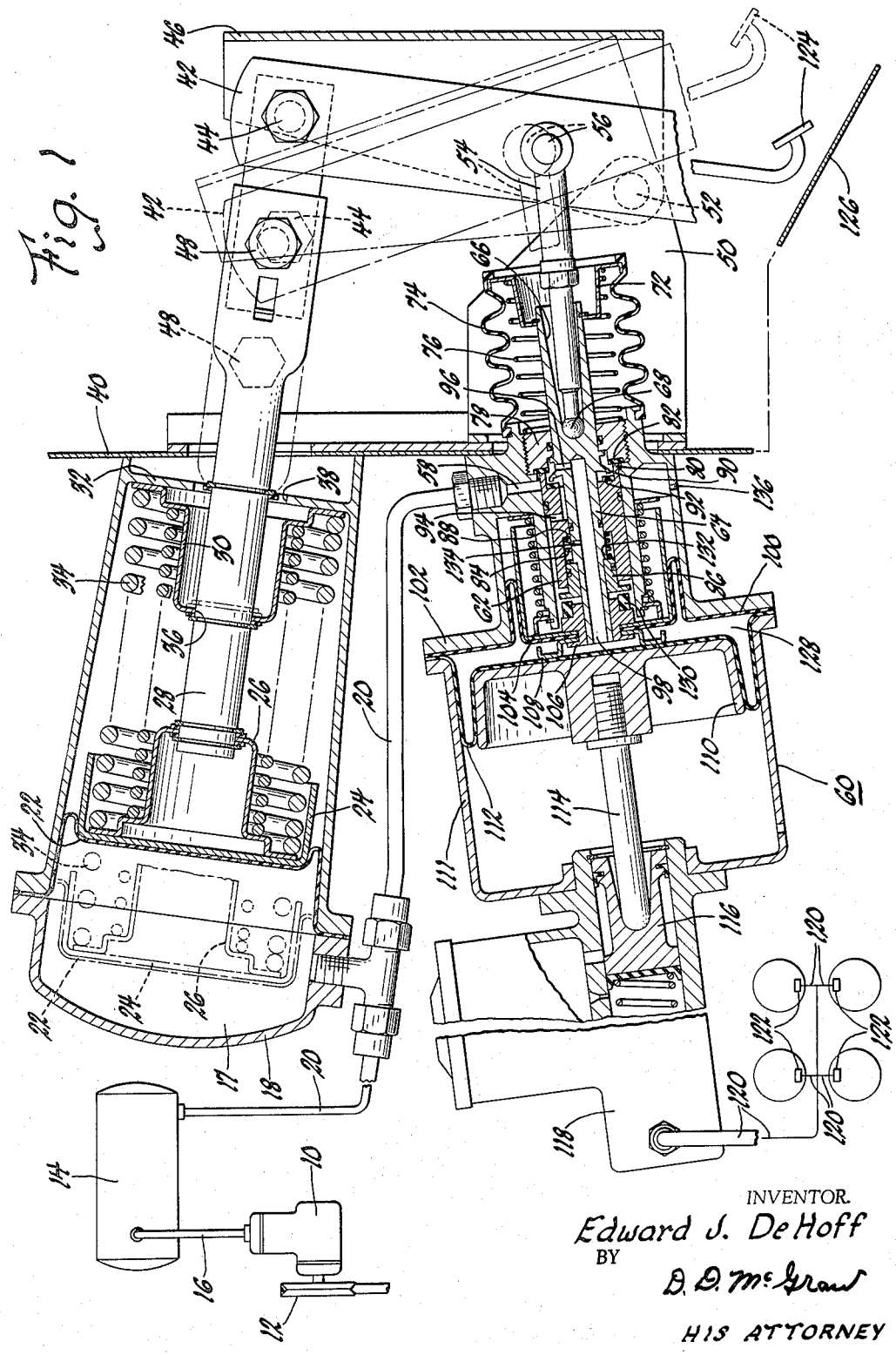
Figure 2:
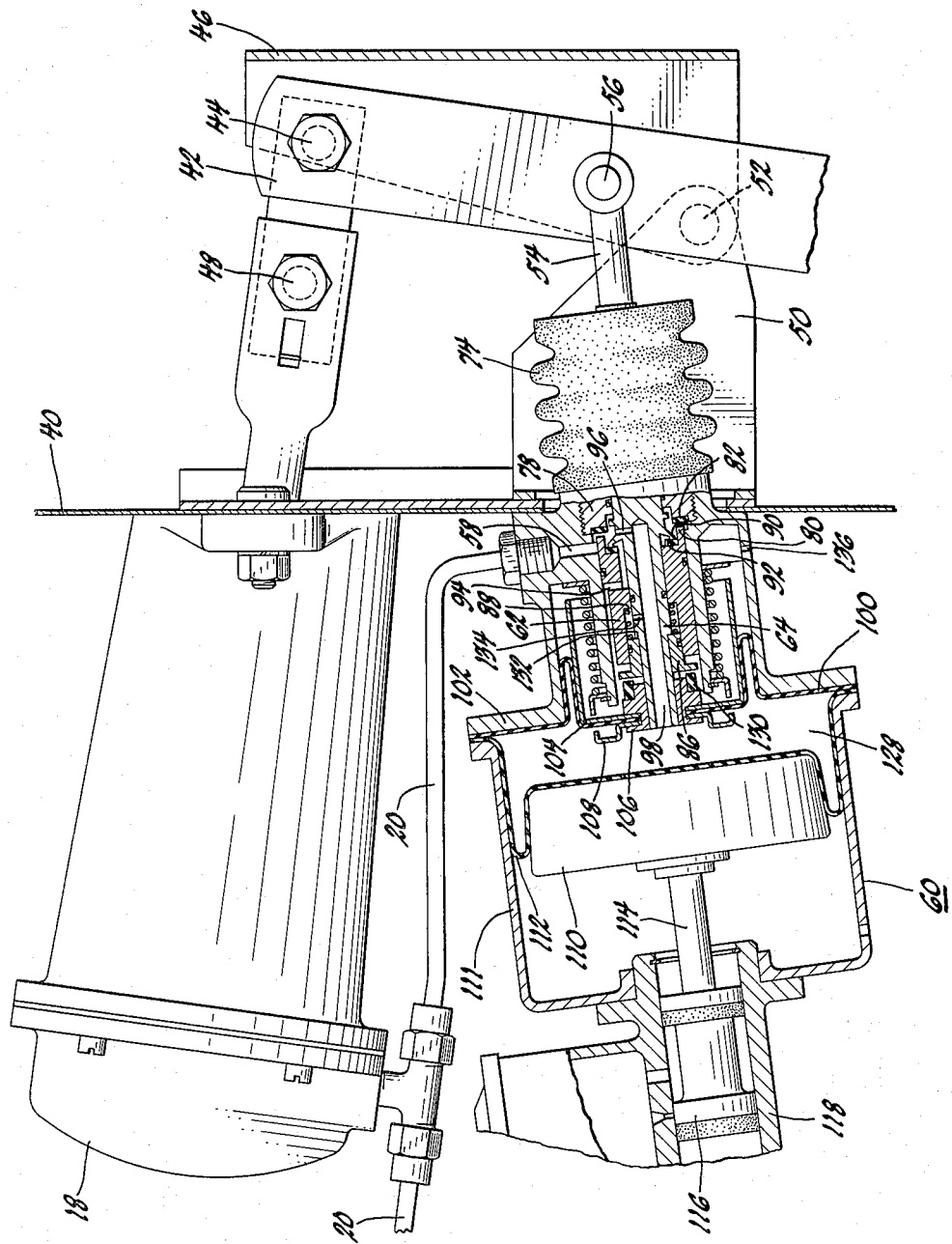

In the drawings:
FIGURE 1 is a sectional view of the subject device, the brake pedal and associated mechanism being shown in a powered and unpowered configuration;
FIGURE 2 is a partially sectional view of the invention, the power booster mechanism shown in the actuated position.
Referring now to FIGURE 1, an air compressor 10 driven by a pulley 12 supplies air under pressure to an accumulator 14 through a line 16. Pressurized air from the accumulator 14 is supplied to a chamber 17 of an air tank 18 through a line 20. A diaphragm 22 is disposed for translational movement within the air tank 18 in response to pressurized air from the accumulator 14. A diaphragm support 24 carries a cup-shaped member 26 which is adapted to engage one end of a pedal control rod 28. Another cup-shaped member 30 is disposed against a wall 32 of the air tank 18 and serves to retain a spring pack 34 on one end as it serves to bias the diaphragm support and the engaged diaphragm away from the wall 32. The cup-shaped member 26 serves as a spring retainer for the opposite end of the spring pack 34. The pedal control rod 28 is slidably carried in an aperture 36 of the cup-shaped member 30 and has a portion extending through an aperture 38 in the wall 32, said portion further extending through the fire wall 40 into the vehicle driving compartment, not shown, on the opposite side of the fire wall 40. The pedal control rod 28 pivotally engages and pendantly supports a brake pedal mounting member 42 at point 44. The pedal control rod 28 also pivotally engages a lever 46 at point 48. The lever 46 is pivotally mounted to a mounting bracket 50 at point 52. The brake pedal mounting member 42 pivotally engages a booster control rod 54 at point 56.

Pressurized air from the accumulator 14 is also supplied through line 20 into a chamber 58 in an air powered booster, generally designated by the numeral 60. A floating valve 62 is disposed for sliding movement around an air valve 64. The air valve 64 has a pocket 66 engaging a ball 68 forming one end of the booster control rod 54. A cupped flange 72 peripherally engages the air valve 64 and a protective boot 74. A spring 76 is disposed between a threaded portion 78 of the air powered booster 60 and the flange 72 to bias the air valve 64 and the booster control 54 away from the threaded portion 78. Therefore, it is apparent that the spring 76 serves as a return spring for the air valve 64 and the booster control rod 54 during the operation thereof.

The floating valve 62 has a projection 80 bearing against an inlet seat 82 carried by the threaded portion 78. A spring 84 bears against a sleeve 86 and a portion 88 of the floating valve 62 to hold the projection 80 in firm engagement with the inlet seat 82, thereby retaining pressurized air in the chamber 58. The air valve 64 has a flange 90 adapted to engage an exhaust valve seat 92 carried by the floating valve 62. A chamber 94 serves as an exhaust passage from the exhaust valve seat in the manner to be hereinafter described. A passage 96 connects the inlet seat 82 in fluid communication with a chamber 98 through the center of the air valve 64.

A diaphragm 100 peripherally engaged by a wall 102 of the air powered booster 60 is also held on an inside diameter by a diaphragm support 104 carried by a sleeve 106. The sleeve 106 is freely slidable along the outside diameter of the air valve 64. The diaphragm support 104 includes a portion 108 adapted to limit the movement of the piston 110.

A diaphragm 112 is likewise peripherally engaged by a wall 111 of the air powered booster 60 and the piston 110 serves as a diaphragm support therefor. The piston rod 114 engages the piston 110 on one end and a piston 116 of a standard hydraulic master cylinder 118 on another end. In any well-known manner, the hydraulic master cylinder 118 is adapted to supply fluid under pressure through a series of lines 120 to wheel cylinders 122 of a motor vehicle.

In operation, air under pressure from the compressor 10 is supplied through an accumulator 14 to the air tank 18 and to the air powered booster 60. Referring to FIGURE 1, the diaphragm 22 and the associated mechanism are shown by phantom lines in the position they assume under unpressurized conditions. As pressurized air enters the chamber 17, the diaphragm 22 and the associated mechanism are driven in the direction of the wall 32 against the biasing force of the spring pack 34. The pedal control rod 28 engaging the cup-shaped member 26 is pushed through the apertures 36 and 38 until the point 44 assumes the position as shown in the solid lines in FIGURE 1. This is the normal position of the point 44 for powered operation of the brake booster and the associated linkage is shown in the position it will assume during powered operation. It is apparent that the brake pedal mounting member 42 has pivoted about the point 52 so that a brake pedal 124 is in a low position relative to a toe board 126. The brake pedal 124 is now poised for powered operation of the vehicle braking system. Referring now to FIGURE 1, if the brakes are to be actuated, pressure is applied to the brake pedal 124 and the brake pedal mounting member 42 pivots about the point 44 and drives the booster control rod 54 and the air valve 64 in the direction of the master cylinder while pivoting at point 56.

Referring now to FIGURE 2, as pressure is exerted on the air valve 64, the flange 90 engages the exhaust valve seat 92 carried on the floating valve 62, closing off the chamber 94. Further movement of the air valve 64 pushes the floating valve 62 thereby drawing the projection 80 away from the inlet seat 82. Air pressure from the chamber 58 will by-pass the inlet seat 82 and enters the 98 through the passage 96. Thereafter air pressure will enter a compartment 128 formed between the diaphragms 100 and 112. The air pressure in compartment 128 will supply a reactive force to one side of the diaphragm 100 by driving the sleeve 106 and an attached bushing 130 against the sleeve 86 which engages a portion 132 of the air valve 64. This reactive force serves to provide a "feel" for brake operation that apprises the operator of the amount of modulated air pressure in the compartment 128.

Air pressure in the compartment 128 also exerts a force on the diaphragm 112 and causes the power piston 110 to be driven in the direction of the master cylinder 118. Due to the engagement of the power piston 110 with the piston 116 through the piston rod 114, movement of the power piston 110 exerts hydraulic pressure through the lines 120 into the wheel cylinders 122 thereby applying the vehicle brakes. It should be noted that, as air pressure is allowed to enter chamber 98, the floating valve 62 senses the air pressure through a passage 134 and, therefore, the floating valve 62 is biased towards the inlet seat 82 by the spring 84 as well as the pressure through the passage 134. The reaction force previously described against the diaphragm 110 will always tend to drive the floating valve 62 toward the inlet seat 82. Therefore, as pressure is released from the brake pedal 124, the floating valve 62 has a tendency to immediately reseat itself against the inlet seat 82, thereby shutting off the incoming air pressure.

As long as sufficient pressure is kept on the brake pedal 124 to overcome the biasing force of the spring 84, the floating valve 62 will be poised to allow the entry of pressure from the compressor and further energization of the brake can be accomplished by merely unseating the floating valve 62. The amount of movement of the brake pedal 124 to accomplish this can be as little as .050 inch. Therefore, this type of brake pedal operation can be accomplished while the pedal 124 is in close proximity to the toe board 126. In order to release the brakes, the pressure is released from the booster control rod 54. The spring 76 will drive the air valve 64 in the direction of the point 56. As previously mentioned, the projection 80 will immediately seat on the inlet seat 82 and, as the flange 90 of the air valve 64 moves toward the point 56, the flange 90 will be disengaged from the exhaust valve seat 92. Immediately, the pressure in the compartment 128 will be lost as the air bleeds through the chamber 98 in the air valve, through the passage 96 past the exhaust valve seat 92, and, finally through the chamber 94. The chamber 94 is in fluid communication with an outlet port 136 and the pressure will therefore be exhausted to the atmosphere.

Referring now to FIGURE 1, if pressure in the line 20 is lost, the chamber 17 of the air tank 18 will not become pressurized and the spring pack 34 will keep the diaphragm 22 in the position as illustrated by the phantom lines. This failure of the diaphragm 22 to move towards the wall 32 of the air tank 18 will maintain the points 44 and 48 on the pedal control rod 28 in a position indicated by phantom lines in FIGURE 1. It is obvious that, as the lever 46 is retained in a position as shown by the dotted lines in FIGURE 1, the brake pedal mounting member 42 will likewise remain pivoted in a counterclockwise fashion around the point 52 as viewed in FIGURE 1. This pivoting of the point 44 around the point 52 will draw the brake pedal 124 into the position illustrated by the brake pedal in phantom. It becomes apparent that the brake pedal 124 is now raised a gerater distance above the toe board 126 than it had been for powered operation and offers a greater mechanical advantage for actuation by the operator of the vehicle.

The air powered booster 60 is capable for creating a direct mechanical link between the booster control rod 54 and the piston rod 114. This mechanical link is established by the air valve 64 moving into engagement with the floating valve 62 which, in turn, is driven into the sleeve 86. The sleeve 86 will, in turn, be driven into the bushing 130 carried by the sleeve 106. Thereafter, any movement of the air valve 64 will cause the portion 108 of the diaphragm support 104 to bear against the back side of the power piston 110, thereby driving the piston rod 114 into the master cylinder piston 116. In this manner, the upraised pedal 124 can be caused to energize the hydraulic braking system in a direct manner without any assistance from the air powered booster. Therefore, when the greatest pressure is necessary to operate the vehicle brakes, the brake pedal mounting member 42 has pivoted to a point that offers the greatest mechanical advantage for manual operation.

It should be understood that any lessening of pressure in the chamber 17 of the air tank 18 will cause the diaphragm 22 to move to some position intermediate those illustrated in FIGURE 1. This intermediately moving diaphragm will therefore position the brake pedal mounting member 42 at some position intermediate the extremes of movement shown in FIGURE 1. In this manner, the increase in mechanical advantage available to the brake pedal as it is pivoted around the point 56 is proportional to the need for increasing leverage for low powered operation. It is apparent that the air powered booster can function as a power booster for the brakes until the air pressure available to it has been completely used and, thereafter, can function as a mechanical link for manual operation of the brakes.

While the embodiment of the present invention, as herein disclosed, constitutes a preferred form, it is to be understood that other forms might be adopted.

What is claimed is as follows:

1. A control device comprising; actuator means, fluid pressure operable means operatively associated with and controlled by said actuator means, and pivot positioning means engaging said actuator means, said pivot positioning means being responsive to pressure changes in said fluid pressure operable means to pivotally position said actuator means to an infinite number of intermediate positions relative to said fluid pressure operable means to vary the mechanical advantage of said actuator means during periods of fluctuating pressure availability in a direct proportion to the pressure change.

2. A brake pedal control device for a power brake booster, said device comprising; actuator means including a brake pedal for controlling the power brake booster, a fluid pressure source for pressurizing the power brake booster, and means responsive to pressure changes in the power brake booster to pivotally change the position of the actuator means relative to the power brake booster, said actuator means being positioned intermediate two extremes of movement so as to offer a varying mechanical advantage during control of said power brake booster as the pressure availability varies.

3. A brake pedal control device for a power brake booster, said device comprising; actuator means including a brake pedal pendantly supported and being pivotally actuatable, fluid operable means engaged by said actuator means and being adapted to assist in the operation of a braking system, and means responsive to pressure in said fluid operable means to change the pendant support of said actuator means an amount proportional to a pressure change thereby providing a varying mechanical advantage for operation of said actuator means.

4. A brake pedal control device for use with a power brake booster, said device comprising; fluid operable means for assisting in the operation of a braking system, actuator means pendantly supported and pivotally engaging said fluid operable means and pressure responsive means including a pendant support for said actuator means and being adapted to vary the position of said pendant support relative to the pivotal engagement of said fluid operable means to said actuator means thereby providing a change in the mechanical advantage available for operation of said actuator means proportional to a change of pressure in said fluid operable means, said change in mechanical advantage being in proportion to the amount of change in pressure.

5. A brake pedal control device for a power brake booster, said device comprising; a fluid operable power booster arranged to assist in the operation of vehicle brakes, means responsive to fluid pressure changes in said fluid operable means and including an output arm, and an actuator lever pendantly supported by the output arm of said fluid pressure responsive means and pivotally engaging said power booster, the fluid pressure responsive means being adapted to vary the pendant support for the actuator means in an arcuate path around the pivotal mounting of the actuator means to the power booster thereby varying the mechanical advantage for the operation of said actuator means in responsive to a varying pressure in said power booster.

6. A device for varying the mechanical advantage availability of a pedal, said device comprising; a power source, means for controlling the power output from said power source, means responsive to changes in pressure in said power output control means, and a pedal adapted to be pivoted around said power output control means to an infinite number of positions intermediate two extremes of pivotal movement by said pressure responsive means to change the mechanical advantage of said pedal during periods of varying pressure availability.

7. A device for controlling the angular relationship of a brake pedal to a power brake booster, said device comprising; a fluid pressure source, a power brake booster in fluid communication with said fluid pressure source, piston means including an output arm, and a brake pedal pendantly supported by said output arm and pivotally engaging said power booster, said piston means being responsive to a change in pressure in said power booster to vary the angular relationship of a brake pedal relative to said power booster thereby changing the mechanical advantage of said brake pedal during operation under varying pressure conditions.

8. A force multiplying device for a brake pedal comprising; a fluid pressure source, pressure operable means drawing pressure from said pressure source and having an input arm, pressure responsive means in fluid communication with said pressure operable means including an output arm, and a brake pedal pendantly supported by the output arm and pivotally mounted on the input arm, said brake pedal having a given mechanical advantage for operation of said pressure operable means during periods of pressure availability, said brake pedal being pivotally repositioned by said pressure responsive means in response to a lowering of pressure in said fluid operable means to gain an increase in mechanical advantage proportional to the decrease in pressure in said fluid operable means.

9. A force multiplying device for a brake pedal used in a power braking system, said device comprising; a fluid pressure source, a brake booster pressurized by said pressure source including means for controlling the pressure from said pressure source to assist in the operation of vehicle brakes, piston means responsive to pressure in said power booster from said power source, and a brake pedal pendantly supported by said piston means and being pivotally mounted on said power booster control means, said brake pedal having a given mechanical advantage for operation of said power booster during periods of maximum pressure availability, said brake pedal being pivoted by the piston means in response to a decrease in pressure from said pressure source thereby increasing the mechanical advantage of said brake pedal for operation during periods of underpowered and unpowered operation of said brake booster.

References Cited by the Examiner

UNITED STATES PATENTS

| 2,844,228 | 7/1958 | Schnell | 91—391 |
| 2,910,147 | 10/1959 | Fishtahler et al. | 91—391 |
| 3,093,120 | 6/1963 | Ayers | 91—391 |
| 3,103,854 | 9/1963 | Price et al. | 91—391 |
| 3,120,155 | 2/1964 | Ayers | 91—391 |
| 3,128,676 | 4/1964 | Ayers | 91—391 |
| 3,182,562 | 5/1965 | Pulkownik et al. | 91—391 |

SALUEL LEVINE, *Primary Examiner.*

FRED E. ENGELTHALER, *Examiner.*

P. E. MASLOUSKY, *Assistant Examiner.*